March 2, 1926.

S. SCHIFF

BALLER

Filed June 10, 1921  2 Sheets-Sheet 1

1,575,283

Inventor
Sigmund Schiff
By Walter F. Murray
Attorney

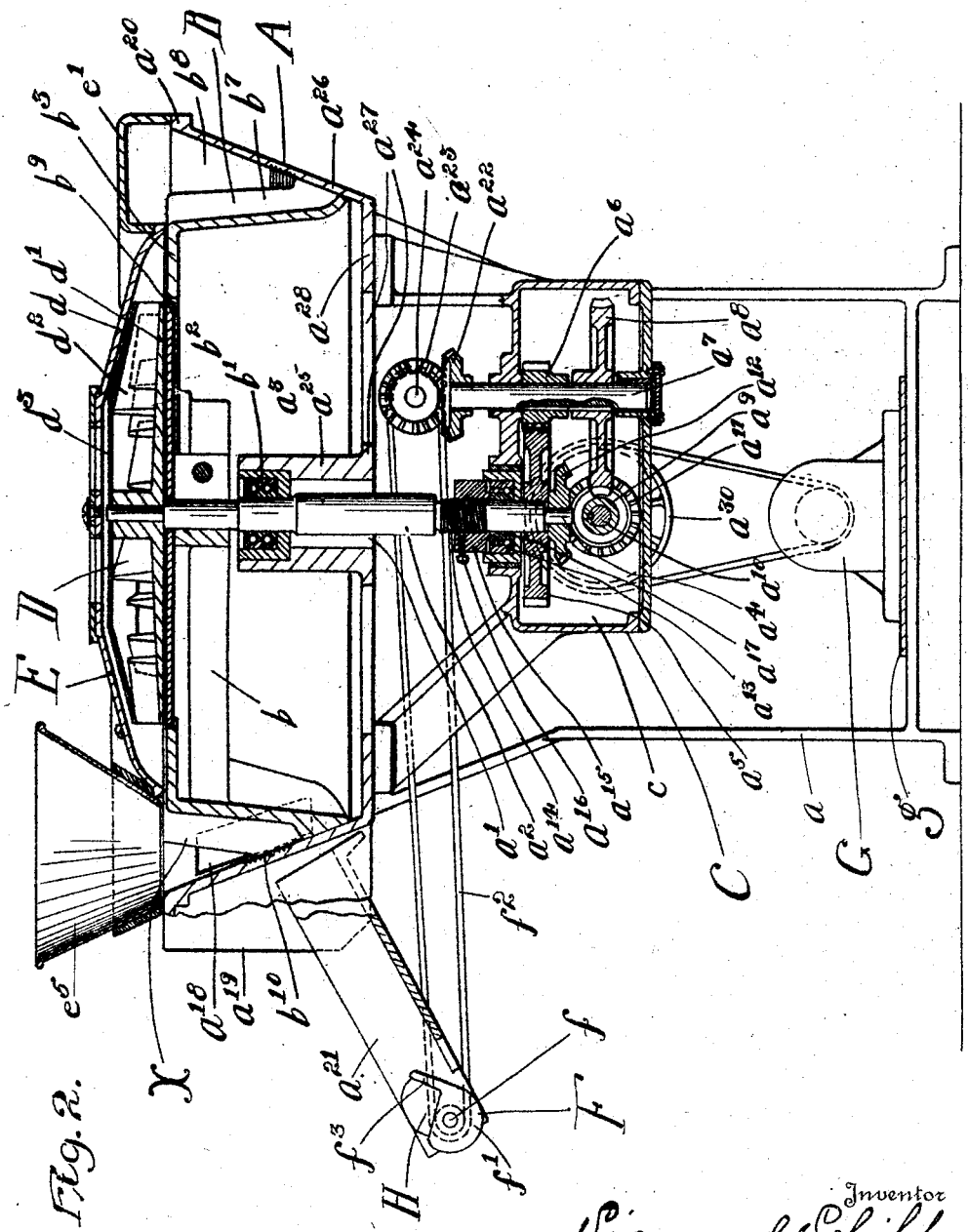

Patented Mar. 2, 1926.

1,575,283

UNITED STATES PATENT OFFICE.

SIGMUND SCHIFF, OF CINCINNATI, OHIO.

BALLER.

Application filed June 10, 1921. Serial No. 476,586.

*To all whom it may concern:*

Be it known that I, SIGMUND SCHIFF, formerly a subject of the Austrian Emperor, now a citizen of the United States of America, and a resident of Cincinnati, in the county of Hamilton and State of Ohio, have invented a new and useful Improvement in a Baller, of which the following is a specification.

My invention relates to devices adapted to develope individual lumps of dough into a ball form having a skin upon it, after which the individual lumps of dough are permitted to raise.

An object of my invention is to provide a baller wherein the dough will be worked or kneaded as the dough passes thru the same.

Another object is to provide a device that works the dough substantially as is dough worked when hand kneaded.

Another object is to provide a device for the purpose stated adapted to develop a skin about the exterior of the dough and to eliminate the use of flour in this process.

Another object is to prevent doubling of lumps of dough.

Another object is to perfectly seal the porous outer surface of a lump of dough in a minimum of working time.

Another object is to provide a device for the purpose stated that will be simple in construction and efficient in operation.

Another object is to provide a device that is sanitary and that can be readily and thoroughly cleaned throughout.

Another object is to provide a device for the purposes stated wherein the possibility of injury to the operator is minimized.

These and other objects are attained by the means described herein and disclosed in the accompanying drawings, in which--

Fig. 2 is a sectional view on line 2--2 of Fig. 1.

Figure 1:
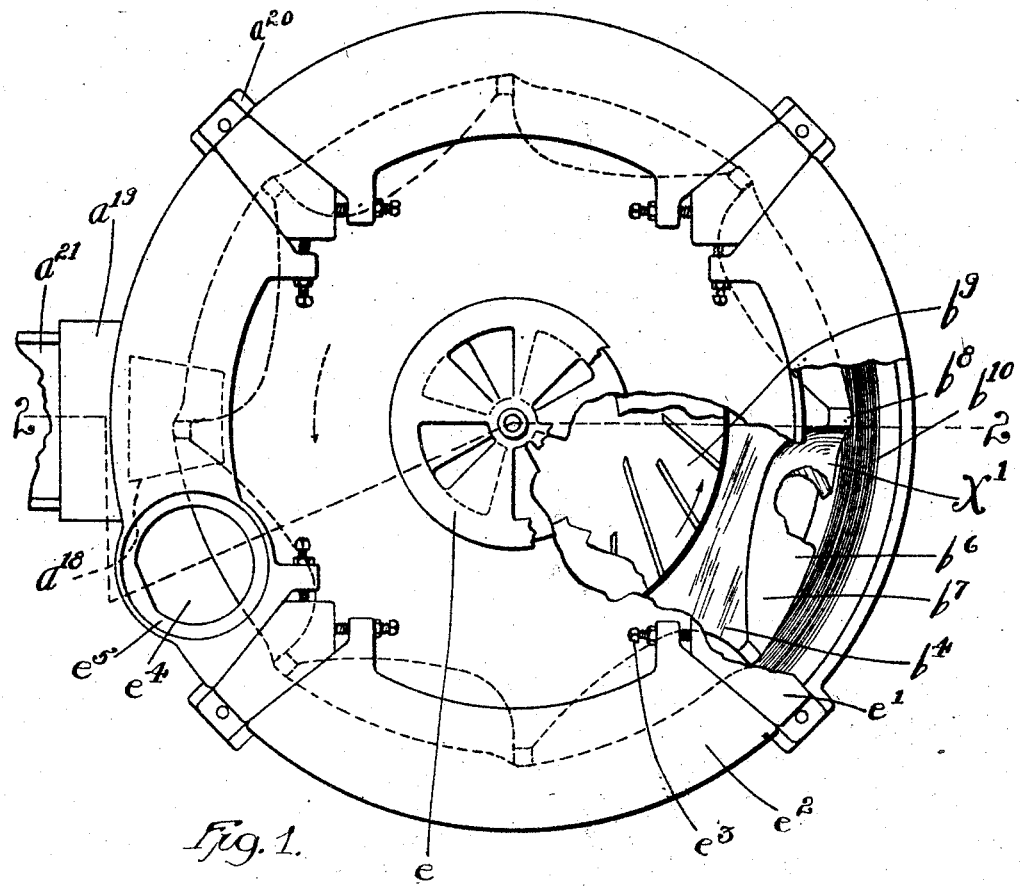
Fig. 1 is a plan view of a device embodying my invention, parts being broken away.

My invention comprises a pot A within which is revolubly mounted a kneading wheel B, between which the dough is worked in its passage through the device. A fan D disposed within the device is used to subject the dough to a continuous draft of air adapted to cooperate with the other parts of the mechanism in developing a dry skin upon the dough as the dough passes through the device.

The pot A is supported on suitable uprights or standards $a$, and the interior shape of the pot is substantially that of a truncated cone, the side wall thereof extending upwardly and outwardly. The pot is preferably cast with a central stem $a^{25}$ spaced from the side wall $a^{26}$ thereof by the arms $a^{27}$ extending from the flange $a^{28}$ formed at the base of the side wall $a^{26}$. The stem has a central bore $a'$ through which a revoluble kneading wheel shaft $a^2$ extends. A bearing $a^3$ mounted upon the stem is adapted to revolubly support the upper end of the shaft $a^2$. The shaft $a^2$ is tubular in construction and has revolubly mounted within it a fan shaft $a^4$. The kneading wheel shaft $a^2$ has mounted upon its upper end and disposed within the pot A, a kneading wheel B. The lower end of the shaft $a^2$ extends into a casing C mounted upon and between the uprights $a$ containing suitable driving mechanisms. The shaft $a^2$ has mounted upon it interiorly to the casing C, a gear $a^5$ engaging the gear $a^6$ mounted upon the vertical shaft $a^7$ extending partly within and without the oil chamber $c$ formed within the casing C. A worm wheel $a^8$ is mounted upon the shaft $a^7$ and engages a worm $a^9$ disposed within the oil chamber $c$ and mounted upon a drive shaft $a^{10}$ extending horizontally through the housing C and having mounted on its exterior end suitable driving means such as a pulley $a^{30}$ driven from a motor G mounted upon a plate $g$ extending between the uprights $a$ adjacent the lower ends thereof. A bevel gear $a^{11}$ is mounted upon the shaft $a^{10}$ and engages the beveled gear $a^{12}$ mounted upon the lower end of the fan shaft $a^4$. From the foregoing it is readily apparent that by varying the relation of the gears described up to this time, it is readily possible to give rotatory motion, to the tube shaft or kneading wheel shaft $a^2$ and the shaft $a^4$ at dissimilar and variable velocities. A suitable thrust bearing $a^{13}$ mounted in the top of the casing C revolubly supports the lower end of the tube shaft $a^2$. The tube shaft immediately above the bearing $a^{13}$ has formed upon it a screw threaded section $a^{14}$ upon which is adjustably mounted a threaded collar $a^{15}$ having a set screw $a^{16}$ extending adjustably therethrough and the inner end of which is adapted to engage the tube shaft $a^2$ and to thereby fixedly secure the collar $a^{15}$ upon the shaft $a^2$. The lower end of the collar $a^{15}$ engages upon the inner race $a^{17}$ of the ball bearing $a^{13}$, whereby it is possible, by adjustment of the collar $a^{15}$ upon the shaft $a^2$, to longitudinally adjust the shaft $a^2$. The pot A has formed in its side wall a discharge port $a^{18}$ communicating with a discharge nozzle $a^{19}$ mounted on the pot A and extending outwardly therefrom. A series of outwardly extending lugs $a^{20}$ are formed about the top of the pot A for a purpose which will be explained hereafter.

The kneading wheel B is disposed within the pot A and is adapted to be fixedly mounted upon the upper end of the tube shaft or kneading wheel shaft $a^2$. The wheel B may be mounted on the shaft by any suitable means such as by the radial arms $b$ formed upon the wheel terminating upon a split bearing $b'$ adapted to be secured upon the tube shaft $a^2$ by any suitable means such a bolt $b^2$. The kneading wheel is preferably made with an open top and bottom in order to reduce the weight thereof, the side walls thereof being cast integral with the arms and with a small centerward extending flange $b^3$ formed above the arms $b$ and at the top of the side wall of the wheel. The lower part of the side wall is tapered at substantially the angle of the interior of the pot so that practically a running fit may be had between the kneading wheel and the pot. The lower portion of the pot is machined in order to provide a proper fit between the pot and kneading wheel. A series of ribs or ridges $b^4$ are formed about the side walls $b^7$ of the kneading wheel, the lower ends of the ribs lying immediately adjacent the lower portion of the interior surface of the pot A and then extending substantially vertically upward from the tapered interior wall of the pot, so as to space the upper ends of the ribs from the upper edge of the pot A. Between adjacent ribs is formed a pocket or notch $b^6$ for which the wall of the pot A forms a wall when the wheel is mounted in the pot. In the operation of the device the kneading wheel B revolves continuously in a given direction as shown by the arrows in Fig. 1. The forward end of the pockets, bearing this rotary motion in mind, is enlarged in comparison with the rear end of the pockets. The lower portion of the side wall $b^7$ of the wheel B lies immediately adjacent the lower interior surface of the sides of the pot A and is spaced therefrom to a distance sufficient to permit rotation of the wheel without permitting any dough to squeeze downwardly therebetween. The pockets in the wheel are so formed that the bottom of the pockets curve upwardly and converge rearwardly so that as the wheel is revolved the dough contained within any one pocket will be moved upwardly at the same time that the wheel forces the dough rearwardly into a portion of the pocket having a continually decreasing width and depth. The side walls of the pocket converge downwardly. The pocket is preferably so formed that the side walls of the forward or enlarged portions of the pockets are spaced substantially equidistant from the vertical line passing thru the point of convergence of the side walls of the pockets as shown in Fig. 2 at X. This form of pocket causes approximately half the weight of the dough to be supported by the wall of the pot and the other half of the weight is supported by the wall of the kneading wheel. This momentary equilization of weight is of prime importance in initiating rotatory motion in the lump of dough, which motion, when once attained, will continue due to the relative movements of the pot and the kneading wheel. It should be observed that at the place X', (see Fig. 1) the pocket is approximately at its deepest and widest. In other words, the widest and deepest part of any one pocket is immediately adjacent the smallest and shallowest part of the pocket next before, and is immediately to the rear of the highest portion of the floor or bottom wall of the pocket next before. The sides and bottom of the pocket compress and work or knead the dough as the dough moves toward the passage $b^8$ connecting adjacent pockets. A flat circular disc $b^9$ of some suitable material, such as sheet iron, may be mounted upon the arms $b$ and forms a closure for the top of the kneading wheel.

The shaft $a^4$ extends upwardly beyond the closure $b^9$ and has mounted upon it a fan D. The fan D may be of any type or kind adapted to force the draft from the center of the device outwardly so that the air will be driven into the pockets about the periphery of the kneading wheel. I have shown a fan comprising upper and lower discs $d$ and $d'$ respectively, between which are disposed the substantially radial blades or paddles $d^2$. The central portion of the upper disc $d$ is perforated as shown at $d^3$, to permit air to enter the center portion of the fan. When the lower disc $d'$ is made of sufficient diameter as to extend over the flange $b^3$ formed on the kneading wheel, the closure $b^9$ may be dispensed with. If no fan is used the closure may also be dispensed with.

A cover E is fixedly mounted upon the pot A by being secured upon the lugs $a^{20}$, the cover functioning as a closure for the entire device. An air valve $e$ is provided within the cover immediately over the opening $d^3$ in the top of the fan, whereby the flow of air through the fan may be regulated. The cover E serves to direct the draft generated by the fan into the pockets. The cover proper terminates on a circular line substantially midway of the width of the pockets, from which point extend the inverted U-shaped brackets $e'$ to thus complete the bridging of the pockets. The outer ends of the brackets are mounted upon the lugs $a^{20}$. The brackets $e'$ have pivotally mounted upon them the curved plates $e^2$ which extend between the body of the cover and the upper edge of the pot A. The curved plates $e^2$ are pivotally mounted upon the brackets by means of the adjustable screws $e^3$. This arrangement permits the observation of the working of the dough and cleaning of the pot and the kneading wheel without necessarily removing the entire cover, for anyone of the curved plates can be individually moved about its pivotal mountings so as to expose the pockets between the brackets $e'$ upon which such moved plate is mounted. One of the curved plates has formed within it a feeding port $e^4$ upwardly from which extends a chute $e^5$ into which lumps of dough may be discharged and from which the dough passes into one of the pockets in the baller. The chute $e^5$ is preferably disposed immediately adjacent the discharge nozzle $a^{19}$ in order that the maximum of work may be performed upon the dough by the baller by the time that the dough is carried around the pot and is discharged from the discharge nozzle $a^{19}$. A discharge chute $a^{21}$ may be connected with the discharge nozzle $a^{19}$ in order to direct the discharged dough from the baller to any other device such as a proofer (not shown).

It is desirable in some bakeries to provide means to remove the dough from the discharge chute $a^{21}$ and to deposit the dough in some other mechanism such as a proofer. In order to facilitate an arrangement of this kind, I have mounted a beveled gear $a^{22}$ upon the exterior of the shaft $a^7$, which beveled gear engages a beveled gear $a^{23}$ mounted upon a shaft $a^{24}$, from which may be driven any of the mechanisms now employed for the said purpose.

The mechanism F employed to transfer the dough from the discharge chute $a^{21}$ comprises generally a revoluble shaft $f$ mounted upon the base of the discharge chute $a^{21}$, the shaft having mounted upon it a drum $f'$ from which extends the fingers or blades $f^3$, which are adapted with the drum to cooperatively form a pocket or basket adapted to tranfer a lump of dough H from the chute $a^{21}$ to a suitable receptacle or loading mechanism operating in conjunction with a proofer. The shaft $f$ may be driven off of the shaft $a^{24}$ by any suitable means such as a chain or belt $f^2$. When the mechanism F is employed with the baller, the discharge chute $a^{21}$ is preferably located upon the opposite side of the pot from that shown in Fig. 2, in order to reduce the space between the mechanism F and the shaft $a^{24}$.

The operation of my device is as follows: The dough is deposited within one of the pockets and as the kneading wheel B is revolved, the dough is repeatedly moved from the front or large part of one pocket toward the rear of said pocket and is then discharged into the next pocket. As the dough is moved rearwardly, it is also moved upwardly by the lower portion or bottom of the pocket. As the dough is moved toward a smaller confining space, it is compressed and worked. The dough engaging the sides of the pot and the kneading wheel continues to engage same while the dough being pushed upwardly stretches the upper part of the mass as the lower part of the mass is acted upon by the bottom of the pocket. A series of grooves $b^{10}$ may be formed in the wall of the pot in order to give the dough a grip upon the pot while working the dough. When the dough reaches the end of one pocket, it tumbles through the passage way $b^8$ into the next pocket where the procedure is repeated. This continues until the dough has made one complete revolution of the pot and has been discharged from the pot by way of the port $a^{18}$, and the discharge nozzle $a^{19}$. The kneading wheel makes about two revolutions while a lump of dough passes from the feeding port to the discharge port.

As the dough is worked, the fan D directs a flow of air upon the dough, thereby carrying off the surface moisture of the dough, and by the time the dough has reached the discharge port $a^{18}$, a dry skin has been formed about the lump of dough. The dough can then be readily handled by the mechanism F and by the proofer into which the dough is then placed.

A very slight clearance is provided between the lower part of the kneading wheel and the lower part of the pot to permit rotation of the kneading wheel. This clearance is readily attained by disposing the kneading wheel in the pot. The split bearing $b'$ is then drawn tight upon the tube shaft $a^2$. The collar $a^{15}$ is then revolubly actuated so as to move the tube shaft $a^2$ longitudinally to such extent as to provide the necessary clearance between the kneading wheel and the pot. The set screw $a^{16}$ is then used to lock the collar upon the shaft $a^2$ and the thrust bearing race $a^{17}$.

Reference has been made to the pockets formed between the pot and the wheel, as extending upwardly and rearwardly. In order to obviate any misunderstanding as to what is meant thereby, it is pointed out that said terms are used in consideration of the movements of lumps of dough through the baller. In other words, lumps of dough are considered as moving rearwardly as they pass from the larger portion of one pocket to the reduced portion of such pocket.

What I claim is:

1. In a device of the class described the combination of a movable and a relatively stationary member having pockets formed between them, the pockets being generally concave and having each a curved bottom formed on the movable member and having its walls diverging upwardly and converging rearwardly, and means to cause relative movement of the first two mentioned members.

2. In a device of the class described the combination of a movable and a relatively stationary member having pockets formed between them, the pockets diverging upwardly and converging rearwardly, means to cause relative movement of the first two mentioned members, and a fan adapted to direct a flow of air into the pockets.

3. In a device of the class described the combination of a movable member and a relatively stationary member, one of the members having downwardly and rearwardly converging pockets each having a bottom, the small end of one pocket communicating with the large end of the next adjacent pocket, and means to cause relative movement of the first two mentioned members whereby a substance placed in a given pocket will be moved toward the small end thereof and will pass into the large end of the next adjacent pocket and so on through all the pockets, said substance being thereby repeatedly kneaded.

4. In a device of the class described the combination of a movable member and a relatively stationary member having downwardly and rearwardly converging pockets, the small end of one pocket communicating with the large end of the next adjacent pocket, means to cause relative movement of the first two mentioned members whereby a substance placed in a given pocket will be moved toward the small end of a given pocket and will pass into the large end of the next adjacent pocket, and a fan adapted to direct a current of air through the pockets.

5. In a device of the class described the combination of a pot having an upwardly and outwardly extending side wall, a kneading wheel mounted revolubly in the pot having a side wall substantially coextensive with the side wall of the pot and having a series of pockets formed between itself and the side wall of the pot, the adjacent pockets communicating at their adjacent ends and the bottoms of the pockets extending upwardly in a direction opposite to the normal rotatory motion of the kneading wheel, and means to revolubly actuate the kneading wheel.

6. In a device of the class described the combination of a pot having an upwardly and outwardly extending side wall, a kneading wheel mounted revolubly in the pot having a side wall substantially coextensive with the side wall of the pot and having a series of pockets formed between itself and the side wall of the pot, the adjacent pockets communicating at their adjacent ends and the bottoms of the pockets extending upwardly in a direction opposite to the normal rotatory motion of the kneading wheel, means to revolubly actuate the kneading wheel, and a fan revolubly mounted adjacent the pockets adapted to direct a flow of air thru the pockets.

7. In a device of the class described the combination of a movable and a relatively stationary member having pockets formed between them, the pockets diverging upwardly and converging rearwardly, means to cause relative movement of the first two mentioned members, and a cover forming a closure for the pockets, said cover consisting of a plurality of independently-pivoted sections.

8. In a device of the class described the combination of a movable and a relatively stationary member having pockets formed between them, the pockets diverging upwardly and converging rearwardly, means to cause relative movement of the first two mentioned members, a fan adapted to direct a flow of air into the pockets, and a cover forming a closure for the pockets adapted to cooperate with the fan in directing a flow of air to the pockets.

9. In a device of the class described the combination of a movable and a relatively stationary member having pockets formed between them, the pockets diverging upwardly and converging rearwardly, means to cause relative movement of the first two mentioned members, a fan adapted to direct a flow of air into the pockets, a cover forming a closure for the pockets adapted to cooperate with the fan in directing a flow of air to the pockets, and an air valve in the cover controlling the flow of air through the fan.

10. In a device of the class described the combination of a movable and a relatively stationary member having pockets formed between them, the pockets diverging upwardly and converging rearwardly, means to cause relative movement of the first two mentioned members, a cover forming a closure for the pockets, having a port in its top, and a feed chute discharging into the pockets through the said port, said cover consisting of a plurality of sections pivotally mounted on the stationary member, one of said sections carrying said feed-chute.

11. In a baller the combination of a pot having a feed port and a discharge port, and a kneading wheel revolubly mounted within the pot and having concave tapering pockets adapted to carry lumps of dough between the feed port and the discharge port and to knead the dough while carrying same.

12. In a baller the combination of a pot having a feed port and a discharge port, and means within the pot adapted to carry lumps of dough between the ports and to knead the dough by repeatedly moving all of the dough comprising the individual lumps thereof upwardly from a lower plane to a higher plane.

13. In a baller the combination of a pot having a feed port and a discharge port, and means within the pot adapted to carry lumps of dough between the ports and to knead the dough by repeatedly moving all the dough comprising the individual lumps thereof upwardly from a lower plane to a higher plane, and to cause the dough to be stretched over part of its area and to be compressed over another part of its area during the movement of the dough.

14. In a baller the combination of a pot having a feed port and a discharge port, a kneading wheel revolubly mounted within the pot adapted to carry lumps of dough between the feed port and the discharge port and to knead the dough while carrying same, and a fan directing a flow of air upon the lumps of dough during their movement through the pot.

15. In a baller the combination of a pot having a feed port and a discharge port, means within the pot adapted to carry lumps of dough between the ports and to knead the dough by repeatedly moving the dough upwardly from a given plane to a second given plane, and a fan directing a flow of air upon the lumps of dough during the kneading thereof.

16. In a device of the class described the combination of supports, a pot mounted on the supports, a casing having an oil chamber formed therein, a revoluble vertical tubular shaft extending from the oil chamber into the pot, a fan shaft mounted revolubly within the tube shaft and extending therefrom, a kneading wheel in the pot mounted upon the tubular shaft having notches formed about its periphery, whereby a series of pockets are formed between the wheel and the pot, the pockets tapering rearwardly and upwardly, the rear end of one pocket communicating with the forward end of the next adjacent pocket, a fan mounted upon the upper end of the fan shaft, and means within the oil chamber to revolubly actuate the tube shaft and the fan shaft.

17. In a baller the combination of a pot having a discharge port in its side wall, a kneading wheel revolubly mounted in the pot, the pot and wheel effecting a closure adjacent the bottom of the side wall of the pot, a series of ribs extending outwardly from the wheel and having their lower ends disposed adjacent the base of the side wall of the pot and having their upper ends spaced from the upper end of the side wall of the pot, pockets formed between the pot and the wheel intermediate adjacent ribs adapted to be brought into registration with the discharge port in the pot, the pockets being enlarged at one end and tapering upwardly toward its reduced portion, the enlarged portion of each pocket being first moved into registration with the discharge port by the movement of the kneading wheel, and the reduced portion of each pocket communicating with the enlarged portion of the pocket next adjacent, and means to direct lumps of dough into the pockets.

18. In a baller the combination of a pot having a discharge port in its side wall, a kneading wheel revolubly mounted in the pot, the pot and wheel effecting a closure adjacent the bottom of the side wall of the pot, a series of ribs extending outwardly from the wheel and having their lower ends disposed adjacent the base of the side wall of the pot and having their upper ends spaced from the upper end of the side wall of the pot, pockets formed between the pot and the wheel intermediate adjacent ribs adapted to be brought into registration with the discharge port in the pot, the pockets being enlarged at one end and tapering upwardly toward its reduced portion, the enlarged portion of each pocket being first moved into registration with the discharge port by the movement of the kneading wheel and the reduced portion of each pocket communicating with the enlarged portion of the pocket next adjacent, means to direct lumps of dough into the pockets, and a fan directing a flow of air into the pockets.

19. In a baller the combination of a pot having a side wall, a kneading wheel revolubly mounted in the pot comprising a side wall, ribs in the side wall and having pockets formed in the side wall intermediate the ribs, the side wall of the pot and the side wall and ribs of the kneading wheel diverging upwardly, the pot forming a wall for the pockets and each pocket communicating at its ends with the next adjacent pockets, a base for the pockets formed on the lower portion of the kneading wheel tapering gradually upwardly from a place immediately below one rib to the next adjacent rib, and the side wall of the wheel being spaced at a greater distance from the side wall of the pot immediately adjacent the lowermost portion of the base of the pockets and approaching the side wall of the pot as the base reaches a higher level, and means to revolve the kneading wheel.

20. In a baller the combination of a pot, a revoluble kneading wheel in the pot, a discharge nozzle into which the pot discharges, a fan adapted to direct a flow of air through the pot, means to remove lumps of dough from the discharge nozzle and means to actuate the kneading wheel, the fan and the dough removing means.

21. In a baller the combination of a pot, a kneading wheel mounted revolubly in the pot, a fan adapted to direct a draft through the pot, and means to actuate the kneading wheel and the fan.

22. In a baller the combination of a pot, a kneading wheel mounted within the pot and having a series of notches in the wheel whereby a series of pockets are formed between the wheel and the pot, means to revolubly actuate the wheel, a cover extending over the wheel terminating adjacent the inner ends of the pockets, and a series of pivotally mounted plates extending between the cover and the pot and forming a closure for the pockets.

23. In a baller the combination of a pot, a kneading wheel mounted revolubly within the pot and having a series of pockets for which the pot forms a side wall, a fan adapted to direct a draft into the pockets, means to actuate the wheel and the fan, a cover extending over the fan terminating adjacent the inner ends of the pockets and cooperating with the fan in directing a draft into the pockets, and pivotally mounted plates extending between the cover and the pot, forming closures for the pockets and cooperating with the cover and the fan in directing a draft into the pockets.

24. In a device of the class described the combination of a movable member and a relatively stationary member having pockets formed between them the pockets being concave in practically every transverse plane, the side walls of the pockets converging downwardly and rearwardly, and the bottom of pocket extending upwardly and rearwardly, and means to cause relative movement of the two members.

25. In a device of the class described the combination of a movable member and a relatively stationary member having pockets formed between them, the side walls of the pockets converging downwardly and rearwardly, and the bottom of pocket extending upwardly and rearwardly, means to cause relative movement of the two members, and a fan adapted to direct a flow of air into the pockets.

26. In a baller the combination of a pot having a side wall, a kneading wheel revolubly mounted in the pot comprising a side wall, ribs in the side wall and having pockets formed in the side wall intermediate the ribs, the side wall of the pot and the side wall and ribs of the kneading wheel diverging upwardly, the pot forming a wall for the pockets and each pocket communicating at its ends with the next adjacent pockets, a base for the pockets formed on the lower portion of the kneading wheel tapering gradually upwardly from a place immediately below one rib to the next adjacent rib, and the side wall of the wheel being spaced at a greater distance from the side wall of the pot immediately adjacent the lowermost portion of the base of the pockets and approaching the side wall of the pot as the base reaches a higher level, means to revolve the kneading wheel, and a fan directing a draft through the pockets.

27. As a new article of manufacture a kneading wheel having a side wall and a series of circumferential pockets formed in the side wall thereof, each pocket having a concave bottom wall extending upwardly and rearwardly.

28. As a new article of manufacture a kneading wheel adapted to be revolved in a horizontal plane, having a side wall, substantially vertical ribs extending over the side wall of the wheel and having their upper ends spaced at a lesser distance than are their lower ends spaced from the center of the wheel, pockets formed intermediate the ribs, the bottoms of the pockets extending gradually upwardly from their lowest points immediately at the rear of the ribs defining the forward end of the pockets toward the ribs defining the rear ends of the pockets, and the side walls of the pockets extending upwardly and inwardly from the bottoms of the pockets and extending gradually outward toward and terminating upon the ribs defining the rear ends of the pockets, and the said side walls extending abruptly from their centermost portion to the ribs defining the forward ends of the pockets.

29. In a device of the class described the combination of a pair of relatively movable members, the members having pockets formed between them, the pockets being generally concave, and reduced in depth and breadth at one end, whereby balls of dough moving through the pockets will have their lower portions moved toward the center of the mass of dough for moving the mass upwardly for stretching the upper surface of the dough and thereby giving a kneading action to the dough.

30. In a device of the class described the combination of a pair of relatively movable members, the members having pockets formed between them, the pockets being generally concave, and reduced in depth and breadth at one end, whereby balls of dough moving through the pockets will have their lower portions moved toward the center of the mass of dough for moving the mass upwardly for stretching the upper surface of the dough and thereby giving a kneading action to the dough, succeeding pockets communicating and having their larger ends disposed at the smaller ends of the adjacent pockets, whereby the balls of dough are relieved from kneading action in their transition from pocket to pocket, whereby to change the position of the balls of dough preparatory to kneading thereof by the following pocket.

31. In a device of the class described the combination of a pair of relatively movable members having pockets formed between them and through which pockets lumps of plastic material are moved by the relative movement of said members, the pockets being concave and communicating at their ends with adjacent pockets, the pockets converging in the direction of movement of the lumps of plastic.

32. In a device of the class described the combination of a pair of relatively movable members having pockets formed between them and through which pockets lumps of plastic material are moved by the relative movement of said members, the pockets being concave and communicating at their ends with adjacent pockets, the pockets converging in the direction of movement of the lumps of plastic, the pockets having bottoms extending upwardly in such direction that the bottom portions of the plastic lumps are moved upwardly into the plastic mass for simultaneously stretching the upper surfaces of the plastic lumps.

33. In a baller the combination of a pot and a kneading wheel arranged for relative movement and having pockets formed between them through which lumps of plastic are moved, adjacent pockets communicating at their ends, the pockets being open at their tops whereby to be non-restrictive of upward movement of the lump of plastic and having walls for moving the entire mass comprising the lumps of dough from a lower plane to a higher plane as lumps pass through the pockets.

In testimony whereof, I have hereunto subscribed my name this 8th day of June, 1921.

SIGMUND SCHIFF.